US012030319B2

(12) United States Patent
Asanuma

(10) Patent No.: US 12,030,319 B2
(45) Date of Patent: Jul. 9, 2024

(54) PRESSURE FLUCTUATION SUPPRESSION DEVICE AND IMAGE FORMING DEVICE

(71) Applicant: Konica Minolta, Inc., Tokyo (JP)

(72) Inventor: Tasuku Asanuma, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 140 days.

(21) Appl. No.: 17/743,889

(22) Filed: May 13, 2022

(65) Prior Publication Data

US 2022/0371327 A1 Nov. 24, 2022

(30) Foreign Application Priority Data

May 24, 2021 (JP) ................................ 2021-087017

(51) Int. Cl.
*B41J 2/175* (2006.01)

(52) U.S. Cl.
CPC ....... *B41J 2/17556* (2013.01); *B41J 2/17513* (2013.01)

(58) Field of Classification Search
CPC .... B41J 2/17556; B41J 2/17513; B41J 2/175; B41J 29/38; B41J 2/18
USPC ........................................................... 347/65
See application file for complete search history.

(56) References Cited

U.S. PATENT DOCUMENTS

2006/0007254 A1* 1/2006 Tanno ..................... B41J 2/175
347/7
2017/0087836 A1* 3/2017 Yokoo ..................... B41J 2/175

FOREIGN PATENT DOCUMENTS

JP 2012250393 A 12/2012
JP 2014226811 A 12/2014
JP 2016112882 A 6/2016

* cited by examiner

*Primary Examiner* — Jason S Uhlenhake
*Assistant Examiner* — Alexander D Shenderov
(74) *Attorney, Agent, or Firm* — CANTOR COLBURN LLP

(57) ABSTRACT

A pressure fluctuation suppression device including a suppressor and a detector. The suppressor is disposed on a flow path of a liquid and suppresses fluctuations in pressure of the liquid in the flow path. The detector detects deterioration of a suppression function of the suppressor.

11 Claims, 11 Drawing Sheets

FIG. 3A Before expansion
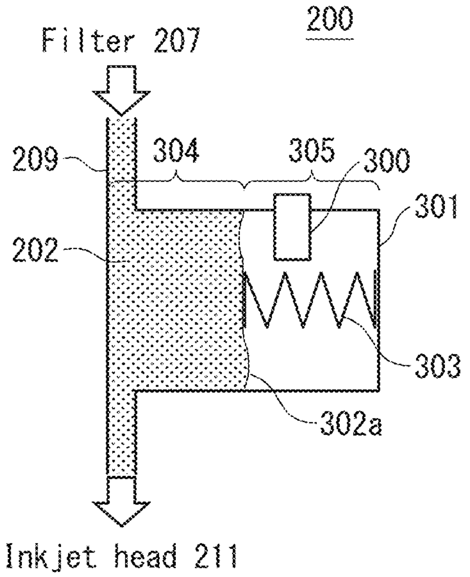
FIG. 3B After expansion
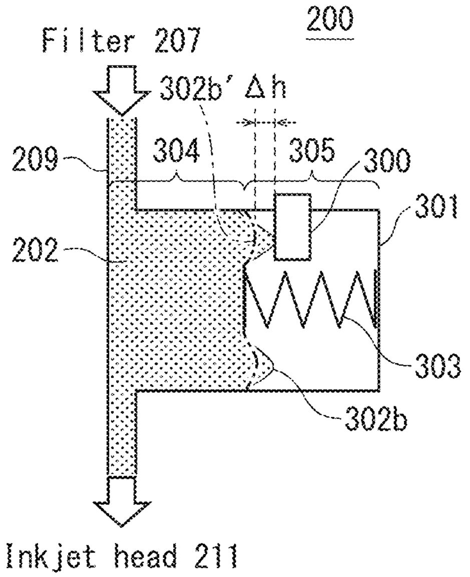
FIG. 3C Before expansion
(ink pressure: low)
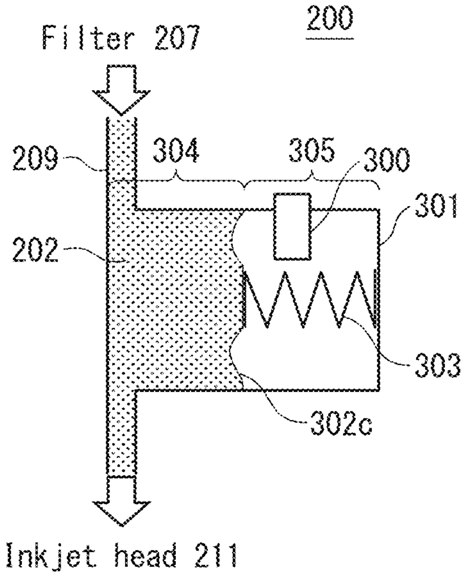
FIG. 3D Before expansion
(ink pressure: high)
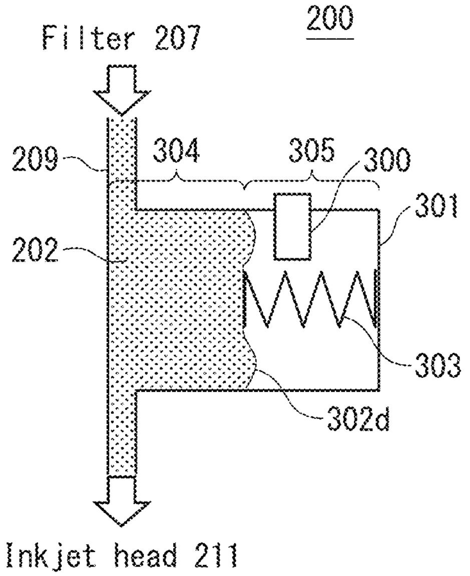

FIG. 6A Before expansion
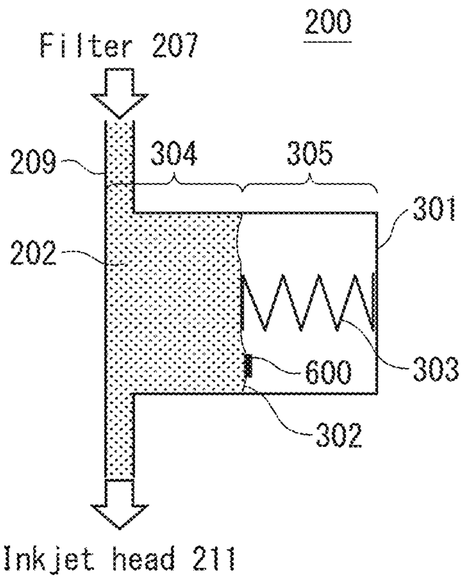
FIG. 6B After expansion (ink pressure: high)
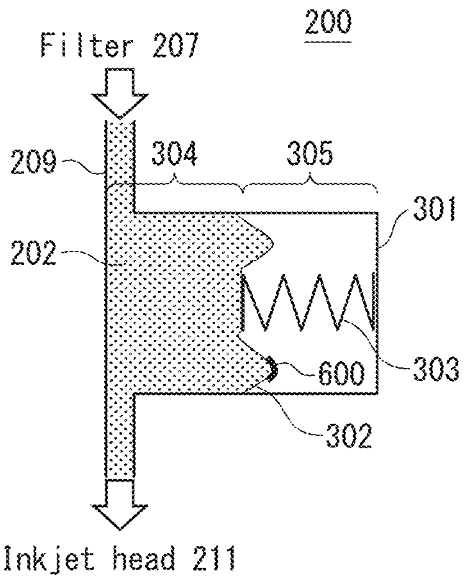

FIG. 7A Before expansion
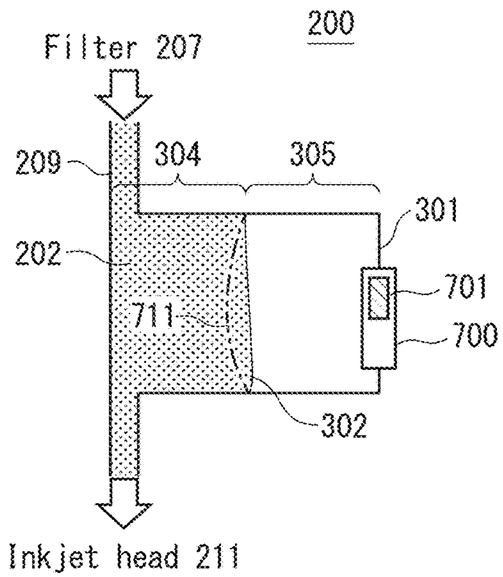
FIG. 7B After expansion (ink pressure: high)
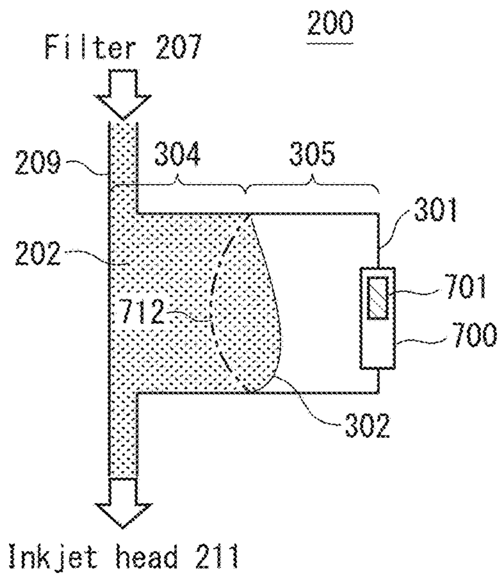
FIG. 7C Pressure adjustment pressure change
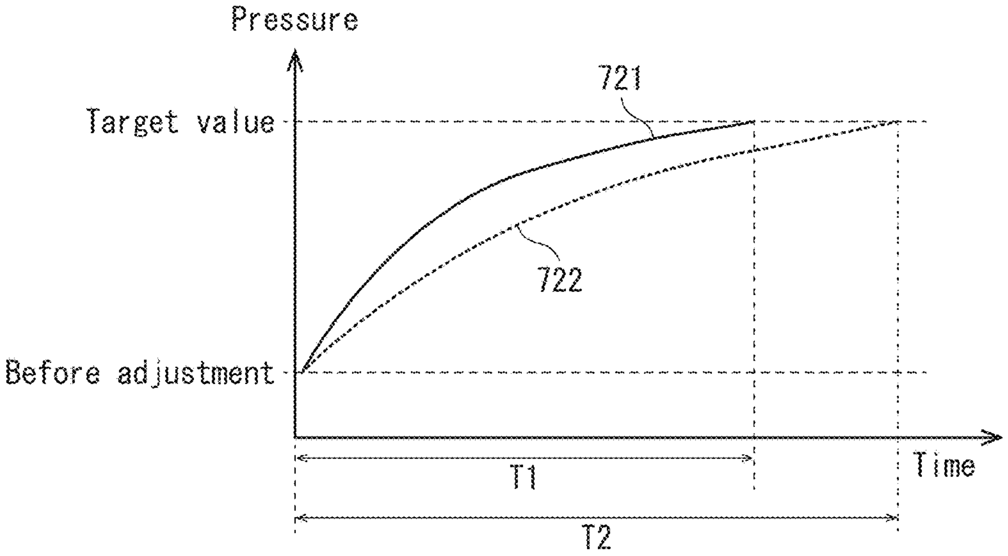

PRESSURE FLUCTUATION SUPPRESSION DEVICE AND IMAGE FORMING DEVICE

CROSS REFERENCES TO RELATED APPLICATIONS

The present invention claims priority under 35 U.S.C. § 119 to Japanese Application No. 2021-087017, filed on May 24, 2021, the entire contents of which being incorporated herein by reference.

BACKGROUND

(1) Technical Field

The present disclosure relates to pressure fluctuation suppression devices and image forming devices, and in particular to techniques for predicting damage to a flexible film due to aging in pressure fluctuation suppression devices.

(2) Description of the Related Art

In recent years, inkjet printers in which an inkjet head ejects ink from nozzles to form an image on a recording medium are being used in a wide range of fields. In order for an inkjet printer to eject ink at an appropriate rate and land it on a recording medium with high accuracy, a meniscus shape of ink in a nozzle is important. As illustrated in FIG. 10, a nozzle 1001 of an inkjet head 10 is open to the atmosphere and a meniscus 1000 is a liquid surface shape of an ink 1002 formed at a tip of the nozzle 1001.

However, in a scanning inkjet printer, the inkjet head is moved, and therefore acceleration may be applied to the ink 1002 and the shape of the meniscus 1000 may be disturbed. Further, although a single-pass inkjet printer does not move the inkjet head, if acceleration is applied to the ink 1002 for some reason, the shape of the meniscus 1000 is disturbed.

When acceleration applied to the ink 1002 is particularly large, the meniscus shape is broken and air enters the nozzle 1012, causing an ejection failure that makes it impossible to eject ink, or ink 1023 leaks from the nozzle 1022, risking an image defect and staining of an interior of the inkjet printer.

In response to such problems, for example, focusing on the point that when acceleration is applied to the ink 1002, the meniscus 1000 is broken because pressure of the ink 1002 in the nozzle 1001 fluctuates greatly, an image forming device has been described in which a flexible film member (also referred to as a "flexible film") is disposed in an inkjet head on a flow path of the ink 1002 from an ink tank that supplies the ink 1002 to the nozzle 1001 (see JP 2012-250393).

In this image forming device, an ink accommodating portion 11 as illustrated in FIG. 11 is provided as a pressure fluctuation suppression device for suppressing ink pressure fluctuation on an ink flow path from the ink tank to the nozzle, and the ink accommodating portion 11 includes a flexible film 1101, a spring 1102, and a housing 1103. The housing 1103 has an ink inlet 1104 and an ink outlet 1105, and an opening 1106. The flexible film 1101 is adhered to and fixed to the housing 1103 so as to cover and close the opening 1106.

The spring 1102 is disposed inside the accommodating portion 11 surrounded by the flexible film 1101 and the housing 1103. One end of the spring 1102 is erected at a position of the housing 1103 facing the flexible film 1101, and the other end is adhered to the flexible film 1101. The spring 1102 pushed the flexible film 1101 towards the outside of the accommodating portion 11.

When pressure of ink drops in the flow path, the flexible film 1101 deforms and changes a volume of the accommodating portion 11 so that ink flows out from the accommodating portion 11. In contrast, when ink pressure rises, the ink flows into the accommodating portion 11 due to deformation of the flexible film 1103. If such a damper function is provided, even if acceleration is applied to the ink, pressure fluctuation of the ink in the flow path can be suppressed, and therefore ejection defects due to air inflow and ink leakage can be reduced.

Inkjet printers can use a variety of inks to form images. For example, ultraviolet (UV) curable ink is an ink that uses a monomer that cures when irradiated with ultraviolet beams as a solvent and has excellent properties such as instant fixing to a recording medium but needs to be heated before ejection from a nozzle. Therefore, when UV curable ink that has become hot comes into contact with the flexible film 1103, the flexible film 1103 is also heated and rises in temperature. When temperature is repeatedly raised each time, an image is formed in this way, the flexible film 1103 gradually expands.

As a result, there is a risk that as the flexible film 1103, which is a pressure fluctuation suppression means for suppressing fluctuation in ink pressure, deteriorates over time, it finally becomes damaged and ink leaks from the accommodating portion 11, and the inside of the inkjet printer and the recording medium become damaged.

SUMMARY

The present disclosure is made in view of the technical problems described above, and an object of the present disclosure is to provide a pressure fluctuation suppression device and an image forming device capable of predicting damage to a pressure fluctuation suppression means due to deterioration over time.

In order to achieve at least the above object, a pressure fluctuation suppression device reflecting an aspect of the present disclosure is a pressure fluctuation suppression device including a suppressor disposed on a flow path of a liquid, that suppresses fluctuations in pressure of the liquid in the flow path; and a detector that detects deterioration of a suppression function of the suppressor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings:

FIG. 3A is a diagram illustrating a flexible film 302 before expansion under normal pressure.

FIG. 3B is a diagram illustrating the flexible film 302 after expansion under higher-than-normal pressure.

FIG. 3C is a diagram illustrating the flexible film 302 before expansion under lower-than-normal pressure.

FIG. 3D is a diagram illustrating the flexible film 302 before expansion under higher-than-normal pressure.

FIG. 6A is a diagram illustrating a state of the flexible film 302 before expansion, under normal ink pressure, according to Embodiment 2 of the present disclosure.

FIG. 6B is a diagram illustrating a state of the flexible film 302 after expansion, under higher-than-normal ink pressure, according to Embodiment 2 of the present disclosure.

FIG. 7A is a diagram illustrating a state of the flexible film 302 before expansion, under normal ink pressure, according to Embodiment 3 of the present disclosure.

FIG. 7B is a diagram illustrating a state of the flexible film 302 after expansion, under higher-than-normal ink pressure, according to Embodiment 3 of the present disclosure.

FIG. 7C is a graph plotting changes over time of air pressure in a second space 305 from air pressure adjustment before and after expansion according to Embodiment 3 of the present disclosure.

DETAILED DESCRIPTION

Hereinafter, one or more embodiments of the present invention will be described with reference to the drawings. However, the scope of the invention is not limited to the disclosed embodiments.

[1] Embodiment 1

(1-1) Image Forming Device Structure

The following describes structure of an image forming device according to at least one embodiment.

Figure 1:
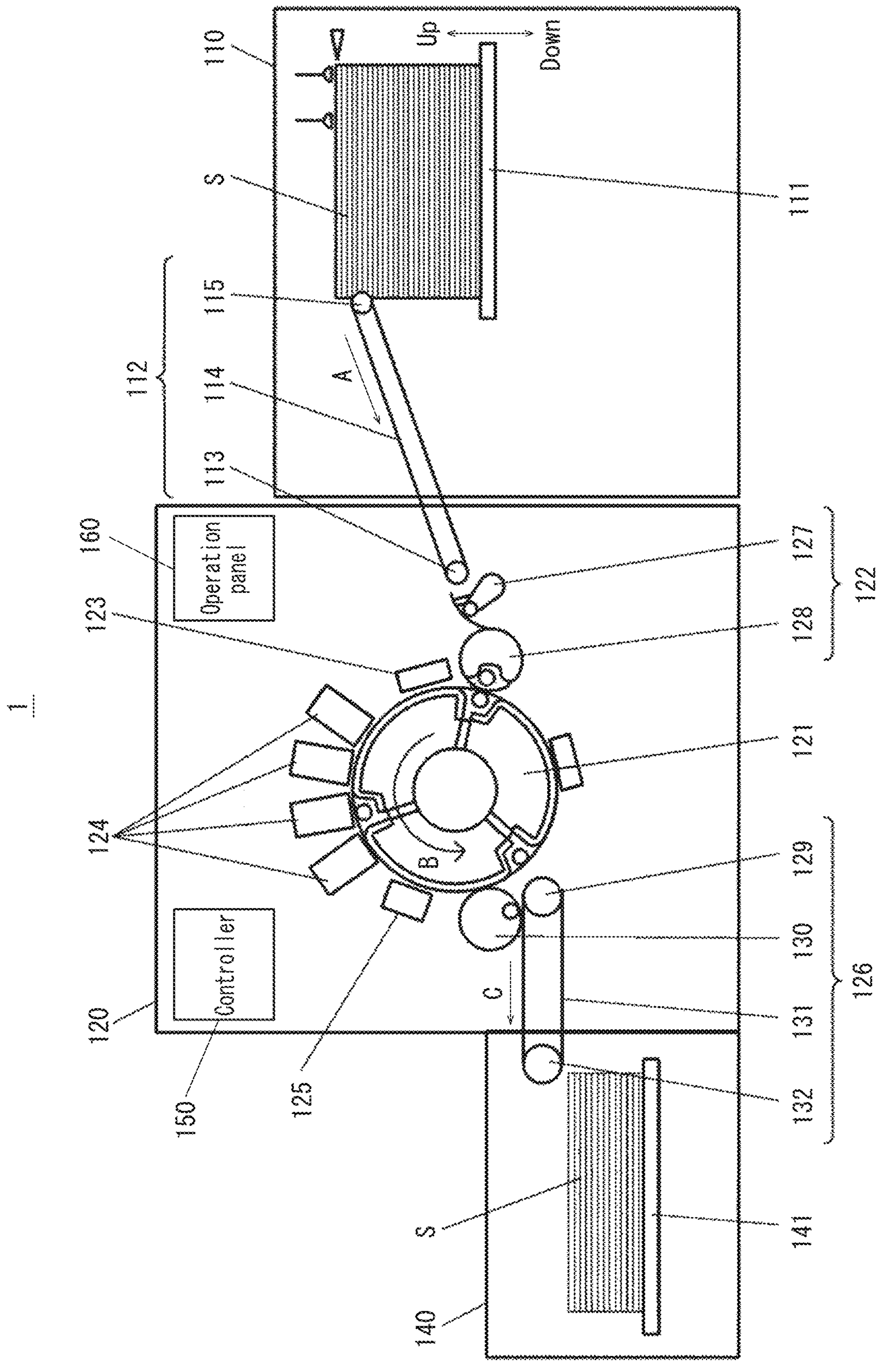
FIG. 1 is a diagram illustrating main structure of an image forming device 1 according to Embodiment 1.

As illustrated in FIG. 1, an image forming device 1 according to at least one embodiment is an inkjet printer that includes a sheet feeder 110, an image former 120, a sheet ejector 140, a controller 150, and an operation panel 160.

The sheet feeder 110 includes a sheet feed tray 111 and a conveyor 112. The sheet feed tray 111 is a tray on which is placed a stack of sheets S used in image formation. As the sheets S, aside from paper such as plain paper and coated paper, various media such as cloth or sheet-shaped resin capable of fixing ink that lands on a surface thereof can be used.

The sheet feed tray 111 moves up and down according to a number of sheets in the stack, to move to a position where a highest sheet S in the sheet stack is fed out by a conveyer 112.

The conveyor 112 uses a pickup roller (not illustrated) to feed sheets S sheet by sheet from the top of the sheet stack on the sheet feed tray 111. The conveyor 112 has a sheet conveyance mechanism in which an endless conveyance belt 114 is hung taut around rollers 113, 115.

In a state where a sheet S fed out by the pickup roller is on the conveyance belt 114, the conveyer 112 rotates the rollers 113, 115, which causes the conveyance belt to perform rotational travel in a direction A of an illustrated arrow to convey the sheet S to the image former 120.

The image former 120 includes a conveyance drum 121, a transfer unit 122, a sheet heater 123, head units 124, a fixer 125, a delivery unit 126, and the like, and forms an image on the sheet S by an inkjet method.

The transfer unit 122 has a swing arm 127 and a transfer drum 128. The transfer unit 122 picks up a sheet S by using the swing arm 127 to hold one end of the sheet conveyed by the conveyor 112, then transfers the sheet S to the transfer drum 128.

The transfer drum 128 transfers the sheet S to the conveyance drum 121 by guiding the sheet S around an outer circumferential surface of the conveyance drum 121.

When the conveyance drum 121 receives the sheet S from the transfer unit 122, the conveyance drum 121 is rotationally driven in a direction of an arrow B to convey the sheet S on an outer circumferential surface of the cylindrical shape of the conveyance drum 121.

The conveyance drum 121 may be provided with an intake hole on the outer circumferential surface, for example, and the sheet S may be attracted to the outer circumferential surface by suction of external air into the intake hole. Further, a claw may be provided to pin an end of the sheet S on the outer circumferential surface.

The conveyance drum 121 is rotationally driven by a conveyance drum rotation drive motor (not illustrated). During this rotational drive, a rotational angle of the conveyance drum 121 is adjusted so that ink ejected by inkjet heads lands on desired locations of the sheet S.

The sheet heater 123 heats the sheet S on the outer circumferential surface of the conveyance drum 121 on a conveyance path from the transfer unit 122 to the head units 124 to have a temperature within a defined range.

Accordingly, the sheet heater 123 is disposed facing the outer circumferential surface of the conveyance drum 121 and raises temperature of the sheet S via heat radiation by supplying power to an infrared heater or the like. Temperature of the sheet S is adjusted to a defined range by controlling an amount of power supplied to the infrared heater or the like.

The head units 124 are arranged downstream of the sheet heater 123 in the direction of rotation of the conveyance drum 121. The head units 124 include a plurality of inkjet heads and form an image on the sheet S by ejecting ink from nozzles of the inkjet heads in synchronization with conveyance of the sheet S by the conveyance drum 121.

The head units 124 may be a single-pass system in which nozzles are arranged over an entire effective image area of the sheet S along an axial direction of the conveyance drum 121 or may be a scanning system in which nozzles are arranged on a carriage that reciprocates along the axial direction of the conveyance drum 21 and ink is ejected while the carriage is moved.

When a scanning system is adopted, a head transport mechanism for moving the carriage moves a nozzle surface of an inkjet head to a position (print area) facing the outer circumferential surface of the conveyance drum 121 when forming an image.

At a time of maintenance or the like, the head transport mechanism may move the nozzle surface of the inkjet head to a position (maintenance area) facing a cleaning device (not illustrated) to perform cleaning.

Further, in order to land ink at appropriate positions on the sheet S, the head units 124 are arranged at positions having appropriate distances from ink ejection surfaces of the inkjet heads to the outer circumferential surface of the conveyance drum 121.

The head units 124 include pressure fluctuation suppression devices that suppress fluctuations in ink pressure in the ink flow paths for sending ink to the nozzles.

According to at least one embodiment, four colors of ink, yellow (Y), magenta (M), cyan (C), and black (K) are used to form a color image. Accordingly, four head units 124 corresponding to four colors of ink, YMCK, are arranged in order from upstream to downstream along the rotation direction of the conveyance drum 121 along the outer cylindrical surface of the conveyance drum 121.

The fixer 125 is disposed downstream of the head units 124 along the rotation direction of the conveyance drum 121 and, for example, uses a mercury lamp to irradiate an entire width of the sheet S in a main scanning direction with ultraviolet beams, curing and fixing ink that has landed on the sheet S.

Energy beams suitable for ink curing differ depending on ink properties, and therefore it is most appropriate to use an energy radiation source according to ink properties, and not limit the energy radiation source to the mercury lamp.

The delivery unit 126 includes a transfer drum 130 and a sheet conveyance mechanism in which an endless belt 131 is hung taut around rollers 129, 132. The transfer drum 130 is disposed facing the outer circumferential surface of the conveyance drum 121 downstream of the fixer 125 along the rotation direction of the conveyance drum 121 and transfers the sheet S carried on the outer circumferential surface of the conveyance drum 121 to the sheet conveyance mechanism of the sheet delivery unit 126.

The sheet conveyance mechanism rotationally drives the rollers 129, 132 to rotate the belt 131 in the direction of the arrow C, conveying the sheet S received from the transfer drum 130 to the sheet ejector 140.

The sheet ejector 140 includes a sheet ejection tray 141, and the sheets S conveyed from the image former 120 by the delivery unit 126 are sequentially loaded onto the sheet ejection tray 141. A stack of the sheets S loaded on the sheet ejection tray 141 can then be collected by a user.

The controller 150 monitors and controls state and operations of each element of the image forming device 1. Further, the controller 150 can receive a print job from an external device such as a personal computer (PC) and provide notifications related to the print job.

The operation panel 160, under control of the controller 150, presents information to a user of the image forming device 1 and accepts instruction input from the user. Accordingly, the operation panel 160 includes a display unit such as a liquid crystal panel and an operation unit such as a touch panel and hard keys.

(1-2) Ink Supply System

Figure 2:
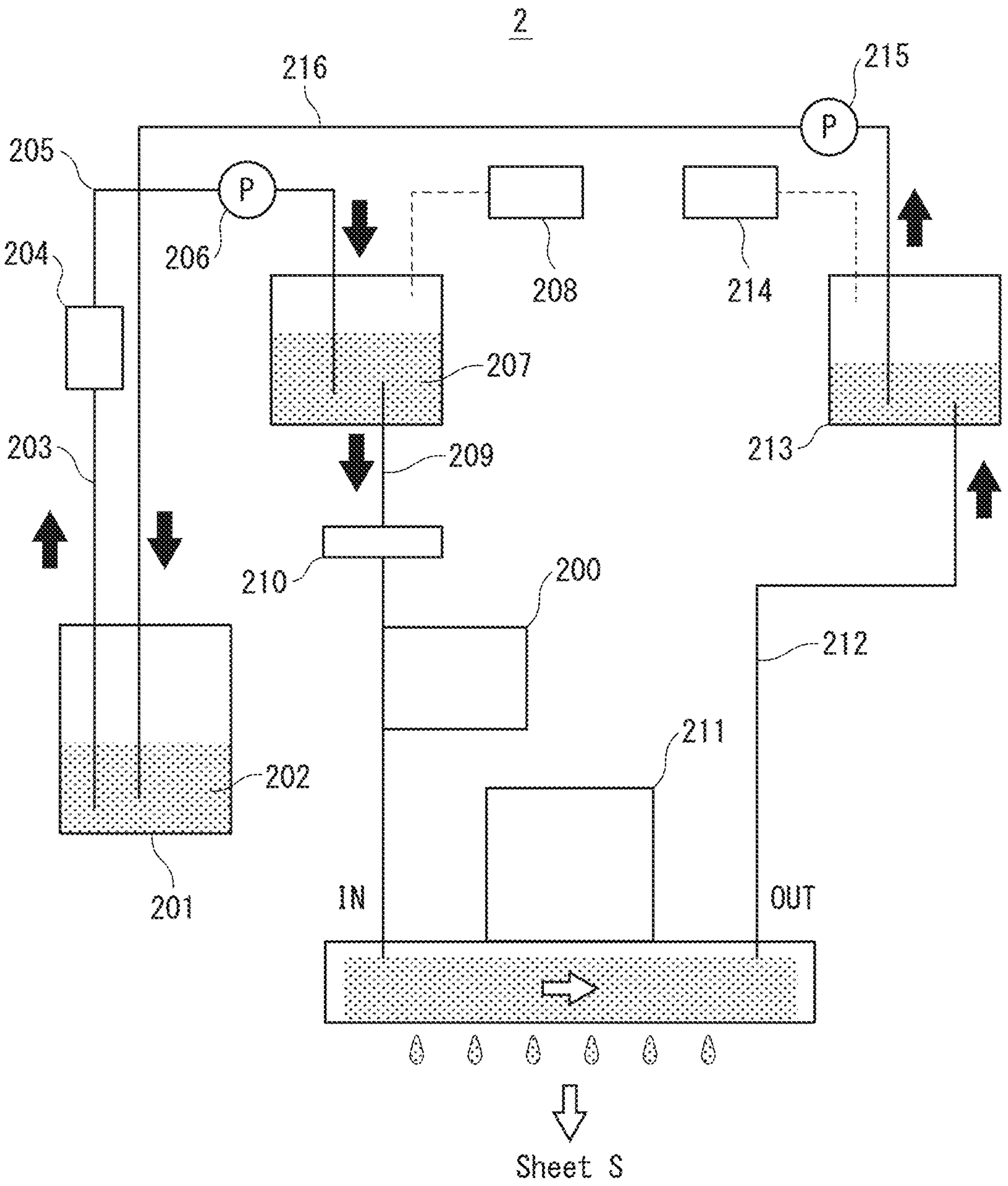
FIG. 2 is a diagram illustrating main structure of an ink supply system 2 included in the image forming device 1.

The image forming device 1 includes ink supply systems that supply ink to inkjet heads from ink tanks that store inks used for image forming. As illustrated in FIG. 2, an ink supply system 2 includes a pressure fluctuation suppression device 200, an ink tank 201, an inkjet head 211, and the like. In FIG. 2, a portion excluding the ink tank 201, a degasser 204, and pumps 206, 215 constitutes a head unit 124.

Further, as described above, according to at least one embodiment, ink becomes a gel at room temperature and changes to a liquid as temperature rises. In particular, an example is described of use of energy beam curable ink such as UV ink that solidifies when irradiated with energy beams. Accordingly, the ink supply system 2 is also provided with a heater (not illustrated) for heating and raising temperature of the ink.

FIG. 2 illustrates an example where the ink supply system 2 has a circulatory flow path structure, but the present disclosure is of course not limited to the circulatory flow path structure, and other flow path structures may of course be adopted (for example, see JP 2014-226811).

The ink tank 201 stores the ink 202, which is a liquid ejected from the inkjet head 211.

When supplying the ink 202 from the ink tank 201 to the inkjet head 211, first, the ink 202 is sucked out from the ink tank 201 by using the pump 206, and the ink 202 is sent to the degasser 204 via the flow path 203. The degasser 204 degasses gas dissolved in the ink 204.

The ink 202 from which dissolved gas has been degassed is sent to a sub tank (also referred to as "IN side sub tank) 207 via a flow path 205. The IN side sub tank 207 is for removing air bubbles mixed into a flow path. An air pressure adjustment device 208 is connected to the IN side sub tank 207 and pressure of an air layer in the IN side sub tank 207 is adjusted.

A filter 210 and the pressure fluctuation suppression device 200 are disposed along a flow path 209 of the ink 202 from the IN side sub tank 207 to the inkjet head 211.

The filter 210 is provided to remove foreign matter contained in the ink 202. Accordingly, clogging can be prevented downstream of the filter 210 along the flow path 209, and in nozzles (not illustrated) of the inkjet head 211, and the like.

Figure 10:
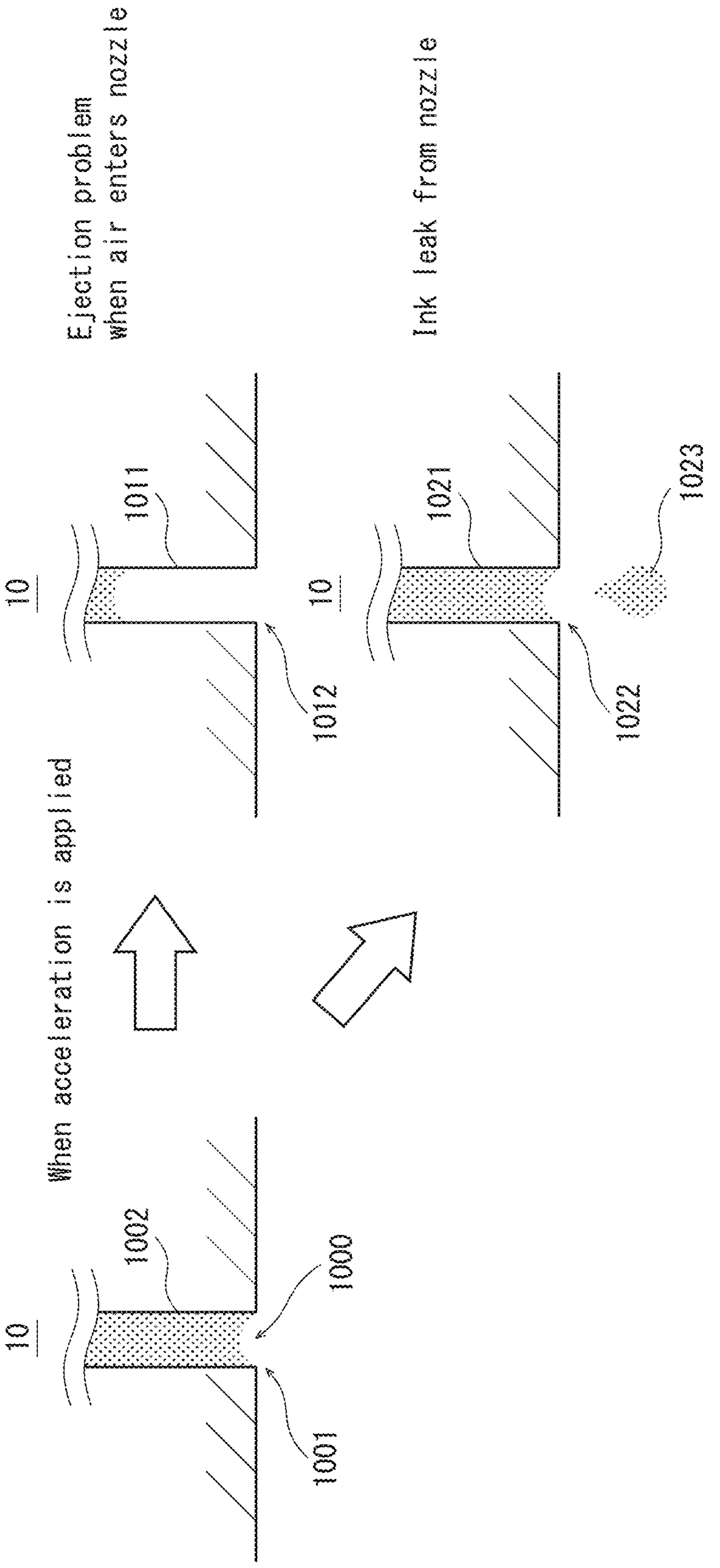
FIG. 10 PRIOR ART
FIG. 10 is a diagram illustrating a problem that can occur when acceleration is applied to ink in a nozzle.

When the ink 202 inside the nozzles of the inkjet head 211 is accelerated, the pressure fluctuation suppression device 200 suppresses fluctuation of ink pressure, preventing air entering the nozzles of the inkjet head 211 and preventing ink from leaking from the nozzles (FIG. 10). The inkjet head 211 ejects ink from nozzles according to an image to be formed.

In order to eject ink from the nozzles, each nozzle is provided with a pressure chamber (not illustrated) and a piezoelectric element (not illustrated).

That is, the pressure chamber communicates with the nozzle and stores ink. The piezoelectric element constitutes a wall surface of the pressure chamber and is deformed when a drive signal corresponding to an image signal is input, such that ink stored in the pressure chamber is ejected from the nozzle.

The ink 202 that has passed through the inkjet head 211 is sent to a sub tank (also referred to as an “OUT side sub tank”) 213 via a flow path 212. An air pressure adjustment device 214 is connected to the OUT side sub tank 213 and pressure of an air layer in the OUT side sub tank 213 is adjusted.

The ink 202 is sent from the IN side sub tank 107 to the OUT side sub tank by a difference between pressure of the air layer in the OUT side sub tank 213 and pressure of the air layer in the IN side sub tank 207. The pump 215 sends the ink 202 from the OUT side sub tank 213 to the ink tank 201 via a flow path 216.

In this way, the following can be prevented: ejection defects of the ink 202 caused by an increase in viscosity due to loss of volatile components from meniscus surfaces of the ink 202 and clogging of flow paths and uneven concentration of the ink 202 caused by settling of components dispersed in the ink 202 in flow paths.

Disposition of the pressure fluctuation suppression device 200 is of course not limited to being on the flow path 209 from the filter 210 to the inkjet head 211 and may be on the flow path 212 from the inkjet head 211 to the OUT side sub tank 213 or may be at another position.

However, for the purpose of suppressing movement of the ink 202 in the vicinity of the nozzles of the inkjet heads 211, it is more effective to dispose the pressure fluctuation suppression device 200 as close as possible to the nozzles.

(1-3) Structure of Pressure Fluctuation Suppression Device 200

The following describes structure of the pressure fluctuation suppression device 200.

As illustrated in FIG. 3A, the pressure fluctuation suppression device 200 includes a housing 301, a flexible film 302*a*, and a spring 303. The inside of the housing 301 is divided into a first space 304 communicating with the flow path 209 and a second space 305 partitioned from the first space 304 by the flexible film 302*a*.

According to at least one embodiment, the housing 301 has a rectangular box shape, but the present disclosure is of course not limited to this example, and instead of a rectangular box shape, a shape such as a cylindrical shape may be used.

Further, when the image forming device 1 includes a plurality of the pressure fluctuation suppression device 200, the shape of the housing 301 may be different between the pressure fluctuation suppression devices 200.

The first space 304 has an inlet for ink to flow in through the filter 207 and an outlet for ink to flow out towards the inkjet head 211. The inlet and outlet allow the first space 304 to communicate with the flow path 209.

When no acceleration is applied to ink in the nozzles and therefore pressure of ink in the first space 304 is normal, the flexible film 302*a* is slack.

As the flexible film 302*a*, a flexible material such as a resin film or a rubber film can be used. As the material of the flexible film 302*a*, a material is preferably selected that can be appropriately flexed according to a magnitude of ink pressure that can be applied to the flexible film 302*a*.

When the flexible film 302*a* is fixed to an inner wall surface of the housing 301 it can be welded by heat or laser application, fixed by mechanical treatment, or adhered by a chemical such as an adhesive.

Further, the housing 301 may be divided into the first space 304 part and the second space 305 part at a position where the flexible film 302*a* is to be fixed, and the two parts may be fixed with the flexible film 302*a* sandwiched in between to form the housing 301.

In any case, the flexible film 302*a* preferably has an appropriate amount of slack after the flexible film 302*a* is fixed to the housing 301.

In the second space 305, a base end of the spring 303 is fixed to an inner wall surface of the housing 301 facing the flexible film 302*a*. The other end (tip) of the spring 303 is fixed to the flexible film 302*a*. The first space 304 communicates with the flow path 209, and therefore when ink pressure in the flow path 209 fluctuates, ink pressure in the first space 304 also fluctuates.

When the flexible film 302*a* is flexed by such pressure fluctuation, fluctuation of ink pressure in the first space 304 and the flow path 209 is suppressed. That is, the pressure fluctuation device 200 fulfils a damper function of suppressing fluctuations in ink pressure in the flow path 209. By adoption of such an arrangement, the spring 303 is prevented from coming into contact with the ink, preventing corrosion and deterioration of the spring 303, sticking of ink to the spring 303, and the like.

Material of the spring 303 may be a metal or a material other than metal such as resin. Further, according to at least one embodiment, the spring 303 is described as a coil spring, but the present disclosure is of course not limited to this example, and a spring other than a coil spring may be used.

Of course, an elastic member having an appropriate elastic modulus may be used in addition to or instead of a spring. An appropriate elastic modulus is such that when ink is not flowing into the first space 304, the flexible film 302*a* is stretched without slack by a biasing pressure (pushing pressure) of the elastic member (spring 303, etc.) and when ink is stored in the first space 304 under normal ink pressure, the flexible film 302*a* loosens.

In this way, if the flexible film 302*a* is appropriately loosened under normal ink pressure, the flexible film 302*a* flexes when ink pressure fluctuates, changing the volume of the first space 304, and therefore a damper function that suppresses fluctuations in ink pressure can be stably realized.

The position where the tip of the spring 303 is fixed is preferably a central area of the flexible film 302*a*. This is because unevenness of tension applied to the flexible film 302*a* can be reduced.

Further, a spring may be disposed in the first space 304 as an auxiliary to the spring 303. However, considering the influence of ink on the auxiliary spring, providing only the spring 303 in the second space 305 is preferred.

When the flexible film 302*a* is flexed to a maximum limit, even if ink pressure in the flow path 209 fluctuates, the flexible film 302*a* cannot be further flexed from a maximally flexed state, and therefore cannot fulfil the damper function of suppressing fluctuations. Therefore, the spring 303 relaxes the flexed state so that the flexible film 302*a* returns from the maximally flexed state to a less flexed state when ink pressure does not fluctuate.

In this way, the flexible film 302*a* becomes able to flex, so that when ink pressure fluctuates, fluctuation can be suppressed, and the damper function can be fulfilled. A restoring force of the flexible film 302*a* itself may act on relaxation of the flexure state of the flexible film 302*a*, but the restoring force of the flexible film 302*a* may vary depending on properties of the material of the flexible film 302*a*, and therefore providing the spring 303 is effective.

For example, as illustrated in FIG. 3C, when ink pressure in the flow path 209 is decreased, the flexible film 302*c* flexes and is displaced towards the first space 304, and therefore a decrease in ink pressure is suppressed. Accordingly, intrusion of air into the nozzles is suppressed. Subsequently, when ink pressure returns to normal, the flexible film 302*c* is returned to a state of not being flexed so much by the action of the spring 303.

In contrast, as illustrated in FIG. 3D, when ink pressure in the flow path 209 is increased, the flexible film 302*d* flexes and is displaced towards the second space 304, and therefore an increase in ink pressure is suppressed. Accordingly, leaking of ink from the nozzles is suppressed. In this case also, when ink pressure returns to normal, the flexible film 302*d* is returned to a state of not being flexed so much by the action of the spring 303.

The flexible film 302*d* gradually expands as it repeatedly flexes due to fluctuations in ink pressure, and surface area increases. Further, the flexible film 302*d* is not uniformly expanded, as a portion that is greatly flexed by ink pressure is particularly easily expanded. There is a limit to expansion of the flexible film 302*d*, and if there is a point where the expansion limit is exceeded by repeated flexure, the flexible film 302*d* is damaged at that point, and ink leaks from the first space 304 to the second space 305.

The second space 305 is surrounded by the housing 301 and therefore ink leakage to the outside of the second space 305 is prevented, but if the flexible film 302*d* is damaged, the damper function suppressing ink pressure fluctuation is impaired.

Further, damage to the flexible film 302*d* itself causes pressure fluctuation in the ink, which may cause problems such as disruption of a meniscus in a nozzle, air intrusion into a nozzle, ink leakage from a nozzle, and the like. Accordingly, it is preferable that a sign of impending damage is detected before the flexible film 302*d* is damaged, and the flexible film 302*d*, or the pressure fluctuation suppression device 200 including the flexible film 302*d*, or the head unit 124 including the pressure fluctuation suppression device 200 is replaced.

As described above, expansion of the flexible film 302*d* proceeds in stages, after which the flexible film 302*d* is damaged by the expansion. As illustrated in FIG. 3B, when the flexible film 302*b* expands, it is largely displaced into the second space 305 when ink pressure increases. For example, displacement due to an increase in ink pressure is indicated by movement of the flexible film 302 from a position indicated by an alternating long and short dash line 302*b*' before expansion to a position indicated a solid line 302*b* after expansion.

Focusing on this point, when the flexible film 302 is displaced and a difference Δh in displacement in the second space 305 compared to prior to expansion exceeds a defined threshold, if a flexible film sensor 300 is positioned to be able to detect presence or absence of contact with the flexible film 302*b*, detection of expansion of the flexible film 302*b* to a defined degree is possible.

The flexible film sensor 300, for example, may be a sensor that mechanically detects contact with the flexible film 302*b*, such as a reed switch that conducts or becomes non-conducting when pressed by the flexible film 302*b* that has expanded.

The flexible film sensor 300 may be a sensor that detects the flexible film 302*b* without physical contact, such as detecting whether or not a light path is blocked by the flexible film 302*b* that has expanded. Regardless of presence or absence of contact with the flexible film 302*b*, it suffices that expansion of the flexible film 302*b* can be detected from whether a displacement amount of the flexible film 302*b* exceeds a threshold value.

Hereinafter, the flexible membrane 302*a*, 302*b*, 302*c*, 302*d* is also referred to as the flexible membrane 302.

(1-4) Structure of Controller 150

Figure 4:
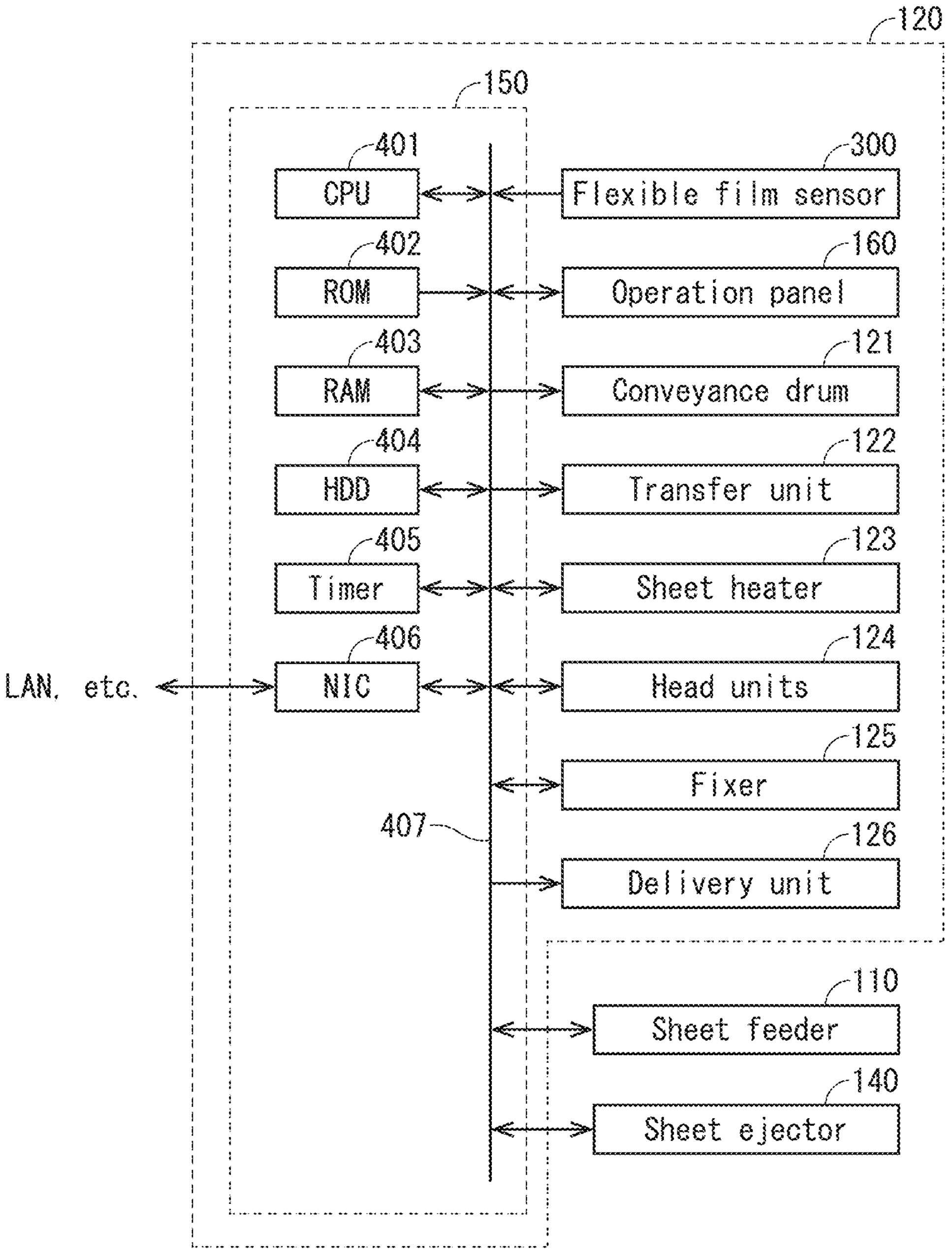
FIG. 4 is a block diagram illustrating a main structure of a controller 150.

The controller 150, as illustrated in FIG. 4, includes a central processing unit (CPU) 401, a read only memory (ROM) 402, a random access memory (RAM) 403, a hard disk drive (HDD) 404, a timer 405, and a network interface card (NIC) 406. The CPU 401, the ROM 402, and the like are connected to each other so as to be able to communicate with each other using an internal bus 407.

When the CPU 401 is reset by switching on power to the image forming device 1, a boot program is read from the ROM 402 and started, and an operating system (OS), control program, and the like are read from the HDD 404 and executed using the RAM 403 as a working storage area. Accordingly, the controller 150 monitors and controls operations of each element of the image forming device 1.

Instead of the ROM 402, rewritable non-volatile memory such as electrically erasable programmable read only memory (EEPROM) or flash memory may be used. Further, the RAM 403 may be a non-volatile memory.

The timer 405 executes a timekeeper process required when the CPU 401 executes a program such as a control program. That is, time from a start timing specified by the CPU 401 to an end timing is timed, and when a period of a length specified by the CPU 401 has elapsed from the start timing specified by the CPU 401, the CPU 401 is notified.

The NIC 406 executes communication processing in order that, for example, the controller 150 receives a print job including image data from an external device such as a PC. The NIC 406 may communicate via a local area network (LAN) or the Internet, for example. Further, the NIC 406 may be a serial interface such as a universal serial bus (USB) or a parallel interface.

The controller 150 receives a detection signal of the flexible film sensor 300 to detect expansion of the flexible film 302. When expansion of the flexible film 302 is detected, an indication of this is displayed on the operation panel 160.

The controller 150 causes the conveyance drum 121 to rotate at a defined speed and timing by controlling a drive signal input to a conveyance drum drive motor (not illustrated). Further, the controller causes the sheet S to be supplied to the conveyance drum 121 by controlling operations of the sheet feeder 110 and the transfer unit 122, and controls operations of the delivery unit 126 to transfer the sheet S to the conveyance drum 121.

The controller 150 controls temperature of the sheet heater 123 to raise temperature of the sheet S carried on the conveyance drum 121 to a target temperature suitable for image forming.

The controller causes energizing of piezoelectric elements corresponding to nozzles to perform deformation operations so that appropriate amounts of ink are ejected from nozzles of the inkjet head of the head unit 124 at appropriate timings, according to image data.

(1-5) Operations of Controller 150

Among operations of the controller 150, operations related to detection of expansion of the flexible film 302 are described in particular.

Figure 5:
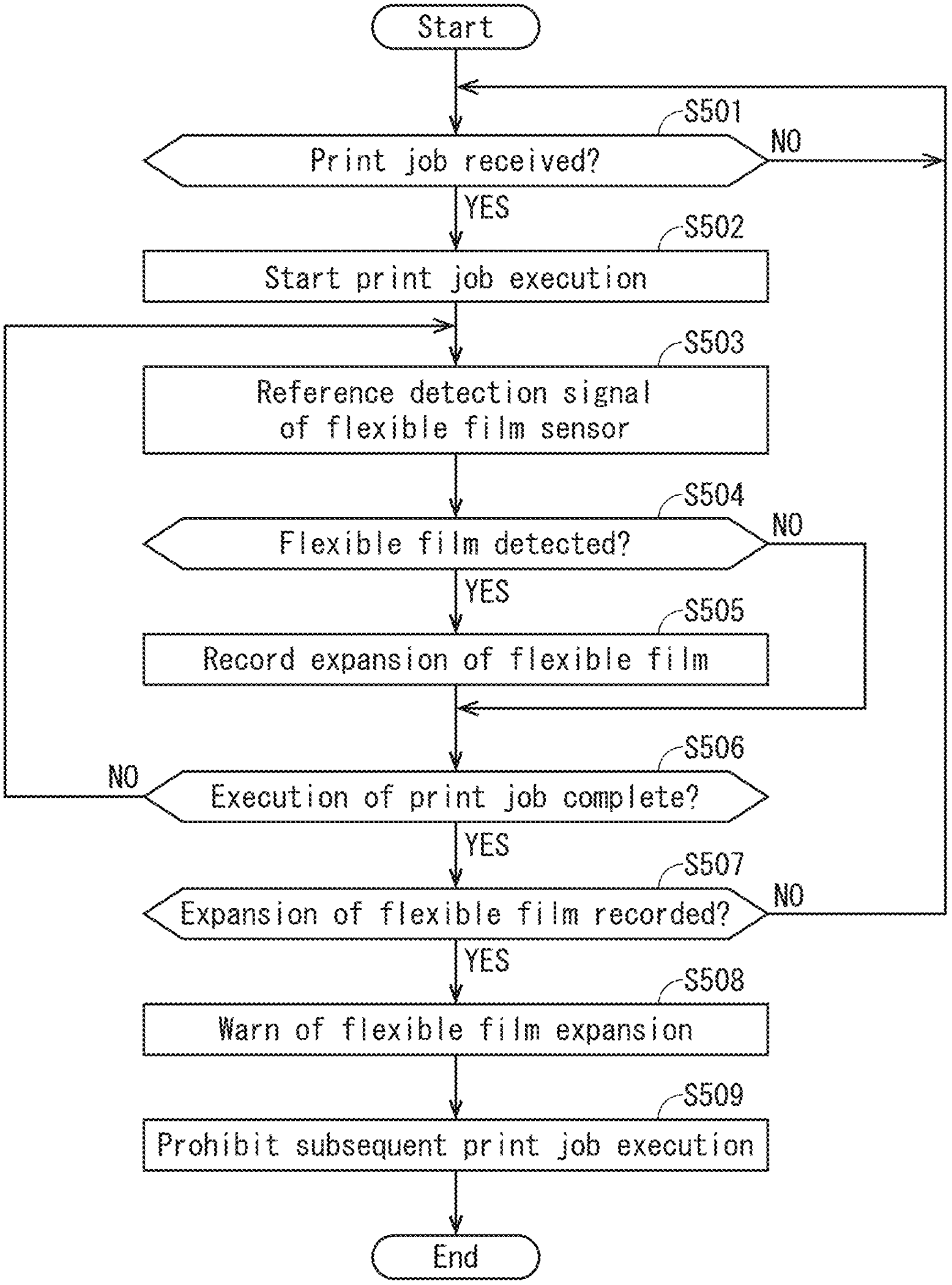
FIG. 5 is a flowchart illustrating processing in which the controller 150 detects expansion of the flexible film 302.

As illustrated in FIG. 5, when the controller 150 receives a print job (S501: "YES"), the controller 150 starts execution of the print job (S502). The controller 150 references a detection signal of the flexible film sensor 300 while executing the print job (S503). If the detection signal of the flexible film sensor 300 indicates that the flexible film 302 has been detected (S504: "YES"), it is recorded that expansion of the flexible film 302 has been detected (S505).

If execution of the print job is not complete (S506: "NO"), processing proceeds to step S503 and the above process is repeated.

When execution of the print job is complete (S506: "YES"), whether or not expansion of the flexible film 302 has been detected is checked. If expansion of the flexible film 302 is not detected (S507: "NO"), processing proceeds to step S501 and waits for the next print job.

If expansion of the flexible film 302 is detected (S507: "YES"), a warning message is displayed by using the operation panel 160 to notify that expansion of the flexible film 302 has been detected (S508). In this case, in addition to display of the warning message, a warning sound may be played. Further, the flexible film 302 has expanded and therefore there is a risk that the flexible film 302 is damaged and a problem may occur due to damage, and therefore subsequent print job execution is prohibited (S509).

(1-6) Comparison with Conventional Art

As illustrated in FIG. 10, in a standby state before ink 1002 is ejected from a nozzle 1001, a surface of the ink 1002 forms a curved surface (meniscus) 1000 inwards of the nozzle 1001 due to an interaction between a surface of the nozzle 1001 and the ink 1002.

As described above, when ink pressure in a nozzle fluctuates according to direction of acceleration applied to inks 1011, 1021, air may enter a nozzle 1012 or an ink droplet 1023 may leak from a nozzle 1022.

Figure 11:
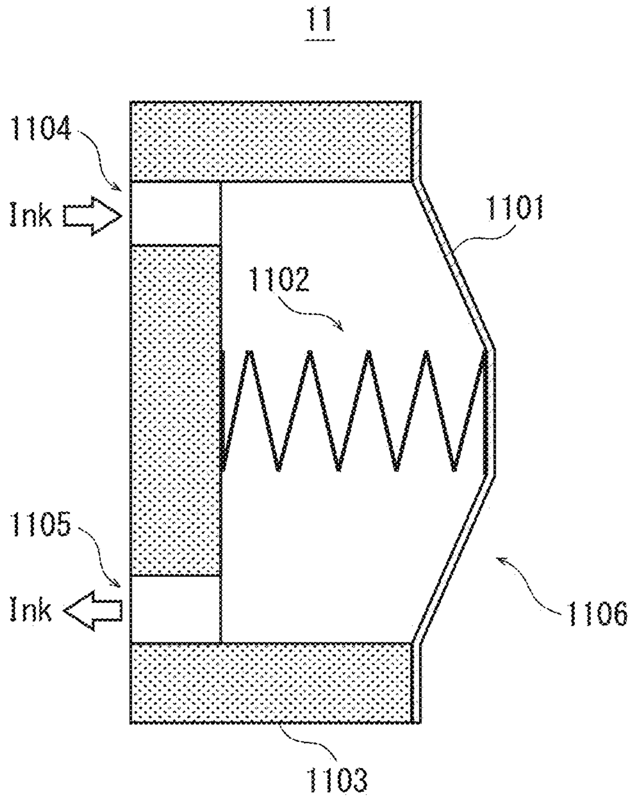
FIG. 11 PRIOR ART
FIG. 11 is a diagram illustrating a main structure of a pressure fluctuation suppression device 11 according to prior art.

In response to such problems, for example, a conventional technique is known in which a pressure fluctuation suppression device 11 as illustrated in FIG. 11 is positioned on a flow path for sending ink from an ink tank to an inkjet head. That is, a film (flexible film) 1101 and an elastic body 1102 such as a spring are disposed on a flow path upstream of the inkjet head, and fluctuation of ink pressure is absorbed by a volume change of the flow path due to deformation of the flexible film 1101.

The pressure fluctuation suppression device 11 has an inlet 1104 for receiving ink from the ink tank and an outlet 1105 for sending out ink to the inkjet head. The inside and outside of the device, or in other words the inside and outside of the flow path, are partitioned by a housing 1103. A spring 1102 stands up from an inner wall surface of the housing 1103, and a tip of the spring 1102 presses a central portion of the flexible film 1101.

According to this structure, when acceleration is applied to ink in the flow path and ink pressure fluctuates, ink pressure in the housing 1103 of the pressure fluctuation suppression device 11 also fluctuates. When the flexible film 1101 flexes in response to this change in ink pressure, volume inside the pressure fluctuation suppression device 11 changes, and therefore a damper function of absorbing ink pressure fluctuation is realized.

As the spring 1102 repeatedly expands and contracts as the flexible film 1101 repeatedly flexes, a mechano-chemical reaction occurs, and sliding of the ink and the spring 1102 promotes polymerization of the ink. As a result, when polymerized ink adheres to the spring 1102, expansion and contraction of the spring 1102 is hindered, and therefore flexure of the flexible film 1101 is also suppressed.

When the flexure of the flexible film 1101 is suppressed, ink pressure is more likely to act locally, and therefore there is a risk of progression of expansion of the flexible film 1101 and damage to the flexible film 1101.

In response to such problems, according to at least one embodiment, the spring 303 is disposed in the second space 305 separated from the ink by the flexible film 302, and therefore there is no risk of expansion and contraction of the spring 303 being hindered due to fixing of the ink.

Further, the degree of expansion is determined by checking magnitude of displacement of the flexible film 302, and therefore a sign of damage can be detected before the flexible film 302 is damaged, and replacement of the pressure fluctuation suppression device 200 can be encouraged. Accordingly, various problems that may occur due to breakage of the flexible film 302 due to deterioration over time can be avoided.

Further, regarding response of the pressure fluctuation suppression device 200 to fluctuation in ink pressure becoming slower when the flexible film 302 expands, the expansion of the flexible film 302 can be detected before the response becomes too slow and problems such as air intrusion into a nozzle and ink leakage from the nozzle can occur, and therefore such problems can be avoided.

[2] Embodiment 2

An image forming device according to Embodiment 2 of the present disclosure has substantially the same structure as the image forming device according to Embodiment 1, with differences in structure for detecting expansion of a flexible film in the pressure fluctuation suppression device. The following mainly focuses on points of difference. In this disclosure, elements that are common to different embodiments and modifications are assigned the same reference signs.

As illustrated in FIG. 6A, the pressure fluctuation suppression device 200 according to at least one embodiment has a structure in which a distortion gauge 600 is attached to the flexible film 302 instead of the flexible film sensor 300 of Embodiment 1.

The distortion gauge 600 is a photo-etched metal leaf or a grid-like resistance wire with a film thickness on the order of a micron on a thin base of electrical insulation such as a resin, and therefore electrical resistance of the metal leaf or resistance wire changes due to expansion and contraction. By detecting magnitude of electrical resistance of the metal leaf or resistance wire, a degree of flexure of the flexible film 302 can be detected.

That is, as illustrated in FIG. 6B, when the flexible film 302 expands, the distortion gauge 600 attached to the flexible film 302 also expands, and electrical resistance of the distortion gauge 600 changes.

In particular, when the flexible film 302 flexes due to an increase in ink pressure in the flow path 209, and the flexible film 302 expands, curvature of the flexible film 302 becomes large, and therefore the distortion gauge 600 is also greatly stretched and electrical resistance of the distortion gauge 600 changes significantly.

When electrical resistance of the distortion gauge 600 reaches a defined resistance value, the controller 150 determines that the flexible film 302 has expanded and takes measures such as outputting a warning message as described above.

Therefore, the effects achieved by the image forming device 1 according to Embodiment 1 can also be obtained by Embodiment 2.

Of course, the degree of flexure of the flexible film 302 may be detected using a means other than the distortion gauge 600.

[3] Embodiment 3

The image forming device 1 according to Embodiment 3 of the present disclosure also has substantially the same structure as the image forming device 1 according to Embodiments 1 and 2, but the pressure fluctuation suppression device 200 differs in detection of expansion of the flexible film 302 by referencing speed of response of the flexible film 302 to ink pressure fluctuation.

That is, as illustrated in FIG. 7A, the pressure fluctuation suppression device 200 is provided with an air pressure adjuster 700 for adjusting air pressure in the second space 305 by pumping air into the second space 305 and exhausting air from the second space 305.

Further, the air pressure adjuster 700 includes an air pressure sensor 701 and can detect air pressure in the second space 305. By pumping air in and out while detecting air pressure in the second space 305 with the air pressure sensor 701, the air pressure adjuster 700 can adjust air pressure in the second space 305 to desired value.

The pressure fluctuation suppression device 200 according to at least one embodiment is different from the pressure fluctuation suppression device 200 according to Embodiments 1 and 2 in that the spring 303 is not provided, and therefore the flexible film 302 can flex freely without restriction by the spring 303.

However, when air pressure in the second space 305 is higher than ink pressure in the flow path 209, the flexible film 302 is pushed towards the first space 304 by the air pressure. On the other hand, when air pressure in the second space 305 is lower than ink pressure in the flow path 209, the flexible film 302 is pushed towards the second space 305.

When ink is heated prior to ejection, heated ink may heat the flexible film 302, and eventually heat air in the second space 305. In such a case, when air pressure rises due to a temperature increase of the air, force applied to the flexible film 302 may change and the damper function deteriorate, and therefore the air pressure adjuster 700 adjusts air pressure in the second space 305 to be within an appropriate range.

Further, the air pressure adjuster 700 is, for example, partially or entirely fitted airtightly into a through hole provided in the housing 301 of the pressure fluctuation suppression device 200. Further, the air pressure adjuster 700 has an air supply/exhaust hole that communicates the inside and outside of the second space 305 and uses a pressure pump to supply/exhaust air via the air supply/exhaust hole.

If the flexible film 302 is damaged an ink leaks, and the ink leaks from the air supply/exhaust hole of the air adjuster 700, a problem of the inside of the image forming device 1 being contaminated may occur. In order to prevent such a problem from occurring as much as possible, the air pressure adjuster 700 is preferably disposed upwards in a vertical direction of the housing 301 of the pressure fluctuation suppression device 200.

When the flexible film 302 has expanded, and the air pressure adjuster 700 sends air into the second space 305 to increase air pressure, the air pressure in the second space 305 increases, the flexible film 302 is pushed by air pressure, and moves towards the first space 304 while flexing. This movement continues until the flexible membrane is free of slack, as illustrated by the alternating long and short dash line 711 in FIG. 7A.

Even after the flexible film 302 has no slack, if the air pressure in the second space 305 as detected by the air pressure sensor 701 is lower than a target value, the air pressure adjuster 700 continues to supply air to the second space 305. Subsequently, when the air pressure sensor 701 confirms that air pressure in the second space 305 has reached a target value, the air pressure adjuster 700 stops supplying air.

On the other hand, when the flexible film 302 has extended, it is not regulated by the spring 303 and therefore, as illustrated in FIG. 7B, the flexible film 302 can be displaced more towards the first space 304 than the flexible films 302 of Embodiments 1 and 2. For example, an amount of displacement is larger than that of the alternating long and short dash line 711 in FIG. 7A, such that the flexible film 302 is displaced to the position of an alternating long and short dash line 712.

As an amount of displacement of the flexible film 302 towards the first space 304 increases, volume in the second space 305 increases. Therefore, in order to increase air pressure in the second space 305 using the air pressure adjuster 700, more air must be supplied than prior to expansion of the flexible film 302.

As a result, as illustrated in FIG. 7C, prior to expansion of the flexible film 302, air pressure in the second space 305 rises as illustrated in graph 721, and therefore a response time required to reach a target value from air pressure before adjustment is T1, whereas after expansion of the flexible film 302, air pressure in the second space 305 rises as illustrated in graph 722, and therefore a response time required to reach the target value from air pressure before adjustment is T2, which is longer than the response time T1.

In this way, the response time required to reach the target value from the air pressure before adjustment becomes longer as the flexible film 302 expands. Focusing on this property, according to at least one embodiment, whether or not the flexible film 302 has expanded is determined based on whether or not a response time exceeds a threshold value.

Specifically, the controller 150 controls the air adjuster 700 to supply and exhaust air pressure in the second space 305 to reach a defined initial value. Next, referring to a detection signal of the air pressure sensor 701, the air pressure adjuster 700 is made to send air into the second space 305 while monitoring air pressure in the second space 305.

The timer 405 is started at a timing when air supply into the second space 305 is started, to start measuring time. Subsequently, when the air pressure in the second space 305 reaches the target value, the air pressure adjuster 700 stops supplying air, and by referring to the timer 405, a response time required to reach the target value from the start of the air supplying is checked.

If this response time is compared with a defined threshold value, and when the response time is longer, it is determined that the flexible film 302 has expanded, and a warning is displayed, the same effects as in Embodiments 1 and 2 can be achieved.

Instead of increasing air pressure in the second space 305, the response time may be measured by decreasing the air pressure in the second space 305. In this case also, the response time can be compared with a threshold value, and whether or not the flexible film 302 has expanded can be determined based on length of the response time. Further, a detection signal of the air pressure sensor 701 may be constantly monitored to measure time of displacement of the flexible film 302 due to fluctuations in ink pressure in the flow path 209, and whether or not the flexible film 302 has expanded may be determined by lengths of time measured.

Further, according to Embodiments 1-3, examples are described in which the sub tank 207 and the second space 305 of the pressure fluctuation suppression device 200 do not communicate with each other, but the present disclosure is of course not limited to this, and when the sub tank 207 and the second space 305 of the pressure fluctuation suppression device 200 communicate with each other, the following becomes possible.

Figure 8:
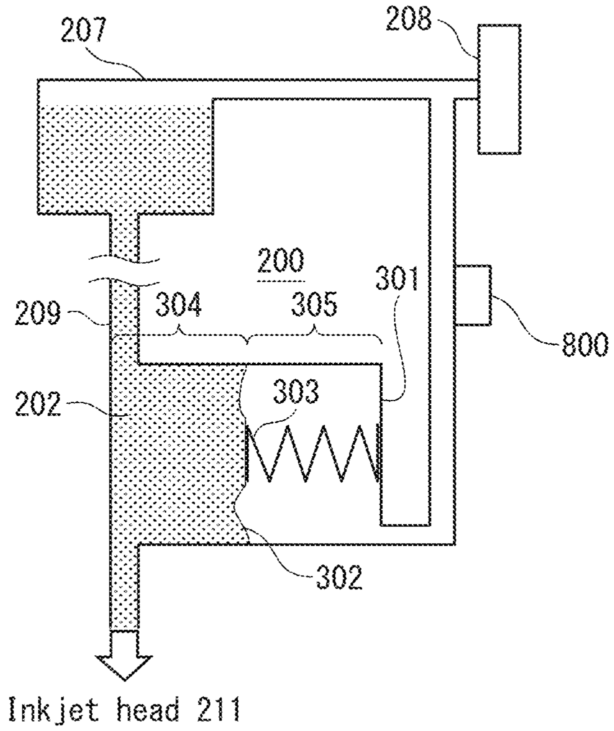
FIG. 8 is a diagram illustrating a structure in which the second space 305 of a pressure fluctuation suppression device 200 and a space above an ink liquid level of a sub tank 207 communicate with each other to adjust air pressure.

As illustrated in FIG. 8, in a structure in which the second space 305 of the pressure fluctuation suppression device 200 and the sub tank 207 communicate with each other and air can flow between them, ink back pressure may be changed by using the air pressure adjustment device 208 during maintenance of the inkjet head 211.

In such a case, if a response time required for the back pressure to reach a target value is measured using an air pressure sensor 800, whether or not the flexible film 302 has expanded can be determined without separate measurement of response time due to changes in pressure in the second space 305.

[4] Modifications

Although the present disclosure has provided description of the embodiments above, the present disclosure is of course not limited to the embodiments described above, and the following modifications can be implemented.

(4-1) According to at least one embodiment, energy beam curable ink is used, but the present disclosure is of course not limited to this example, and other types of ink or liquids other than ink may be used.

(4-2) According to at least one embodiment, the pressure fluctuation suppression device 200 communicates with the flow path 209 at two locations, an inlet that receives ink via the filter 210 and an outlet that sends ink to the inkjet head 211, but the present disclosure is of course not limited to this example, and the number of communication ports with the flow path 209 may be other than two.

Figure 9:
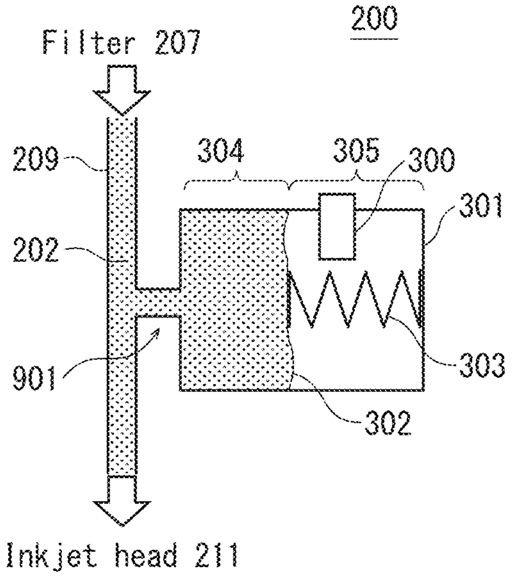
FIG. 9 is a diagram illustrating a modification in which a first space 304 of the pressure fluctuation suppression device 200 and a flow path 209 communicate with each other via a single communication port 901.

For example, as illustrated in FIG. 9, the pressure fluctuation suppression device 200 communicates with the flow path 209 only through a communication port 901. Even in the pressure fluctuation suppression device 200 having such a structure, the damper function can be fulfilled by flexure of the flexible film 302 according to pressure fluctuation of ink. Further, prediction of breakage of the flexible film 302 can be achieved by application of the present disclosure.

(4-3) According to at least one embodiment, when expansion of the flexible film 302 is detected (FIG. 5, S507: "YES"), subsequent execution of print jobs is prohibited (S509), but the present disclosure is of course not limited to this example.

Detection of expansion of the flexible film 302 does not necessarily means that the flexible film 302 will immediately be damaged. Therefore, even if expansion of the flexible film 302 is detected, if only a warning message is displayed and execution of print jobs is not prohibited, the image forming device 1 can continue to execute print jobs, and therefore convenience for a user can be improved until the pressure fluctuation suppression device 200 is replaced.

On the other hand, if print jobs continue to be executed, the opportunities increase for acceleration to be applied to ink causing fluctuation in ink pressure, and therefore expansion of the flexible film 302 progresses and there is a risk of damage to the flexible film 302 before the pressure fluctuation suppression device 200 is replaced. If the flexible film 302 is damaged, it becomes difficult to normally supply ink from the ink tank 201 to the inkjet head 211, and therefore an image of sufficient quality cannot be formed even if a print job is executed.

Accordingly, it is desirable to monitor whether ink has leaked from a damaged part of the flexible film in the second space 305 of the pressure fluctuation suppression device 200 in a period from detection of expansion of the flexible film 302 to replacement of the pressure fluctuation suppression device 200 and prohibit print job execution if ink is detected.

As a structure for detecting ink, for example, a pair of electrodes are arranged at a bottom of the second space 305 of the pressure fluctuation suppression device 200 separated from each other, and whether or not the pair of electrodes are conductive is monitored. In the case of conduction, leaked ink has accumulated across the pair of electrodes, and therefore it can be determined that the flexible film 302 is damaged.

As long as the pair of electrodes are arranged close to each other within a range where they do not come into contact with each other due to vibration or the like, even a small amount of ink can be made conductive, and therefore sensitivity for detecting leaked ink can be increased.

Further, when it is difficult to predict which part of the flexible film 302 may be damaged, pairs of electrodes may be arranged at a plurality of positions in the second space 305. Further, in order to detect ink leakage at an early stage, it is desirable to position the electrodes close to the flexible film 302 within a range that does not come into contact with the flexible film 302 when flexed by fluctuation in ink pressure.

By doing so, even if expansion of the flexible film 302 is detected, execution of print jobs can continue as long as high image quality is ensured, improving user convenience.

(4-4) According to at least one embodiment, the pressure fluctuation suppression device 200 is disposed in the image forming device 1, but the present disclosure is of course not limited to this, and the pressure fluctuation suppression device 200 may be disposed in a device other than the image forming device 1.

That is, as long as a device discharges a liquid from a nozzle and a problem may occur due to acceleration being applied to the liquid, damage to the flexible film 302 over time can be predicted by applying the present disclosure. Accordingly, the pressure fluctuation suppression device 200 can be replaced before the flexible film 302 is damaged, and therefore problems caused by damage to the flexible film 302 can be prevented.

(4-5) According to at least one embodiment, a warning message is displayed by using the operation panel 160 when expansion of the flexible film 302 is detected, but the present disclosure is of course not limited to this.

That is, a warning message may be sent to an external device such as a PC. For example, if expansion of the flexible film 302 is detected while receiving and executing a print job from an external device, a warning message may be sent to the external device. Further, if there is an external device that monitors status of the image forming device 1, a warning message may be transmitted to the external device.

There is not always a user in the vicinity of the image forming device 1, and therefore if a warning message is transmitted to an external device and displayed to be easily visible to human eyes, the pressure fluctuation suppression device 200 can be replaced promptly. Accordingly, it is possible to prevent a user from suffering a disadvantage such as being unable to use the image forming device 1 due to breakage of the flexible film 302.

(4-6) Although embodiments of the present invention have been described and illustrated in detail, the disclosed embodiments are made for purposes of illustration and example only and not limitation. The scope of the present invention should be interpreted by terms of the appended claims.

What is claimed is:

1. A pressure fluctuation suppression device comprising:

a suppressor disposed on a flow path of a liquid, that suppresses fluctuations in pressure of the liquid in the flow path; and a detector that detects deterioration of a suppression function of the suppressor;

wherein:

the suppressor includes a flexible film that defines a boundary of the flow path, and the flexible film suppresses fluctuations in pressure of the liquid in the flow path by flexing in response to the pressure;

wherein the suppressor includes a first space communicating with the flow path and a second space separated from the first space by the flexible film; and wherein the detector includes a pressure detector that detects pressure in the second space and detects the deterioration in the suppression function from a duration of a response to a change in the pressure in the second space.

2. The pressure fluctuation suppression device of claim 1, wherein repeated flexure of the flexible film causes expansion of the flexible film, and the detector detects deterioration of the suppression function from a degree of expansion of the flexible film.

3. The pressure fluctuation suppression device of claim 1, wherein the detector includes a film displacement detector that detects displacement of the flexible film and detects deterioration of the suppression function from size of the displacement.

4. The pressure fluctuation suppression device of claim 3, wherein the film displacement detector is disposed outside the flow path.

5. The pressure fluctuation suppression device of claim 3, wherein the film displacement detector is a contact sensor, and the detector determines the size of the displacement depending on whether or not the film displacement detector detects contact with the flexible film.

6. The pressure fluctuation suppression device of claim 1, wherein the detector includes a film displacement detector that detects displacement of the flexible film and detects deterioration of the suppression function from size of the displacement, and the film displacement detector is disposed in the second space.

7. The pressure fluctuation suppression device of claim 1, wherein the detector includes a pressure adjuster that adjusts pressure in the second space, and the change in the pressure in the second space is due to adjustment by the pressure adjuster.

8. The pressure fluctuation suppression device of claim 7, further comprising:

a reservoir storing the liquid upstream of the pressure adjuster on the flow path; and a communication port communicating the second space and the reservoir, wherein the pressure adjuster forms a common negative pressure between the second space and the reservoir.

9. The pressure fluctuation suppression device of claim 1, further comprising a notifier that notifies of an error when the deterioration of the suppression function is detected.

10. The pressure fluctuation suppression device of claim 9, wherein the notifier includes a display for displaying a warning to notify of the error.

11. An inkjet type of image forming device that ejects ink from a nozzle to form an image, the image forming device comprising:

a pressure fluctuation suppression device comprising:

a suppressor; and a detector, wherein the suppressor is disposed on a flow path of the ink and suppresses fluctuations in pressure of the ink in the flow path, and the detector detects deterioration of a suppression function of the suppressor, and the flow path communicates with the nozzle;

wherein:

the suppressor includes a flexible film that defines a boundary of the flow path, and the flexible film suppresses fluctuations in pressure of the liquid in the flow path by flexing in response to the pressure;

wherein the suppressor includes a first space communicating with the flow path and a second space separated from the first space by the flexible film; and wherein the detector includes a pressure detector that detects pressure in the second space and detects the deterioration in the suppression function from a duration of a response to a change in the pressure in the second space.

* * * * *